United States Patent [19]
Maier

[11] Patent Number: 5,484,014
[45] Date of Patent: Jan. 16, 1996

[54] DEVICE FOR SEALING A GAP BETWEEN COMPONENTS OF GROUPS OF COMPONENTS

[75] Inventor: Karl Maier, Karlsfeld, Germany

[73] Assignee: MTU Motoren - Und Turbinen-Union Muenchen GmbH, Munich, Germany

[21] Appl. No.: 989,017

[22] PCT Filed: Sep. 11, 1991

[86] PCT No.: PCT/EP91/01725

§ 371 Date: May 11, 1993

§ 102(e) Date: May 11, 1993

[87] PCT Pub. No.: WO92/05377

PCT Pub. Date: Apr. 2, 1992

[30] Foreign Application Priority Data

Sep. 13, 1990 [DE] Germany ............ 40 29 010.7

[51] Int. Cl.⁶ ............................. F28F 9/22; F28D 7/06
[52] U.S. Cl. ................... 165/159; 165/9; 165/81; 165/176; 277/53; 277/189
[58] Field of Search ............... 165/82, 83, 159, 165/160, 176, 81, 9; 277/53, 184, 189

[56] References Cited

U.S. PATENT DOCUMENTS

| | | | |
|---|---|---|---|
| 2,171,049 | 8/1939 | Simmons | 277/189 X |
| 2,517,512 | 8/1950 | Tigges et al. | 165/9 |
| 2,666,624 | 1/1954 | Flurschutz | 165/9 |
| 4,105,062 | 8/1978 | Bell, III et al. | 165/9 |
| 4,256,171 | 3/1981 | Zeek | 165/9 X |
| 4,679,619 | 7/1987 | Wohrl et al. | 165/81 |
| 4,781,388 | 11/1988 | Wohrl et al. | 277/53 |
| 4,809,774 | 3/1989 | Hagemeister | 165/176 X |
| 4,961,588 | 10/1990 | Brienza | 277/189 X |
| 4,976,310 | 12/1990 | Jabs | 165/82 |

FOREIGN PATENT DOCUMENTS

| | | |
|---|---|---|
| 0143665 | 6/1985 | European Pat. Off. . |
| 0199322 | 10/1986 | European Pat. Off. . |
| 0199320 | 10/1986 | European Pat. Off. . |
| 3514377 | 10/1986 | Germany . |

*Primary Examiner*—Leonard R. Leo
*Attorney, Agent, or Firm*—Evenson, McKeown, Edwards & Lenahan

[57] ABSTRACT

For the sealing of a gap between at least two components or groups of components which are movably arranged with respect to one another, particularly of a heat exchanger, a device is indicated in the case of which a strip-shaped sealing body, which is connected with one component, is sealingly and movably guided in a groove of the other component, and in the case of which the sealing body is composed in the manner of layers of elements, in the longitudinal direction of the gap. The layers are arranged to be displaceable and freely expandable, are suspended at one component in a swivelling manner, and are spatially movably guided on the other component by way of the groove, with a clamping effect.

14 Claims, 5 Drawing Sheets

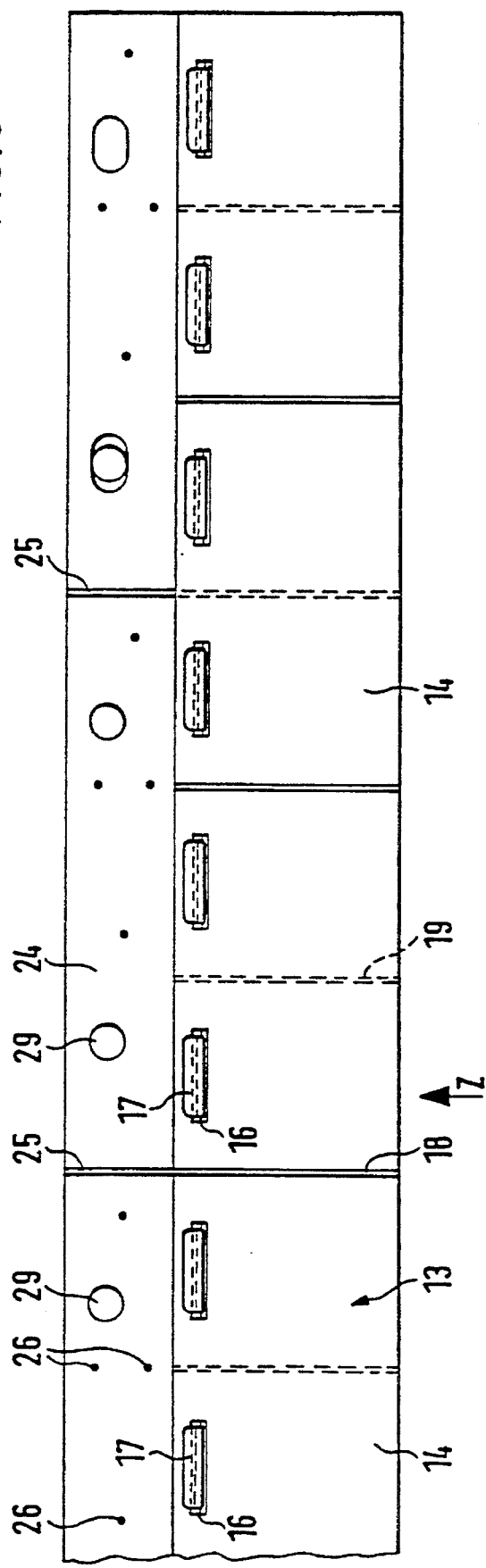

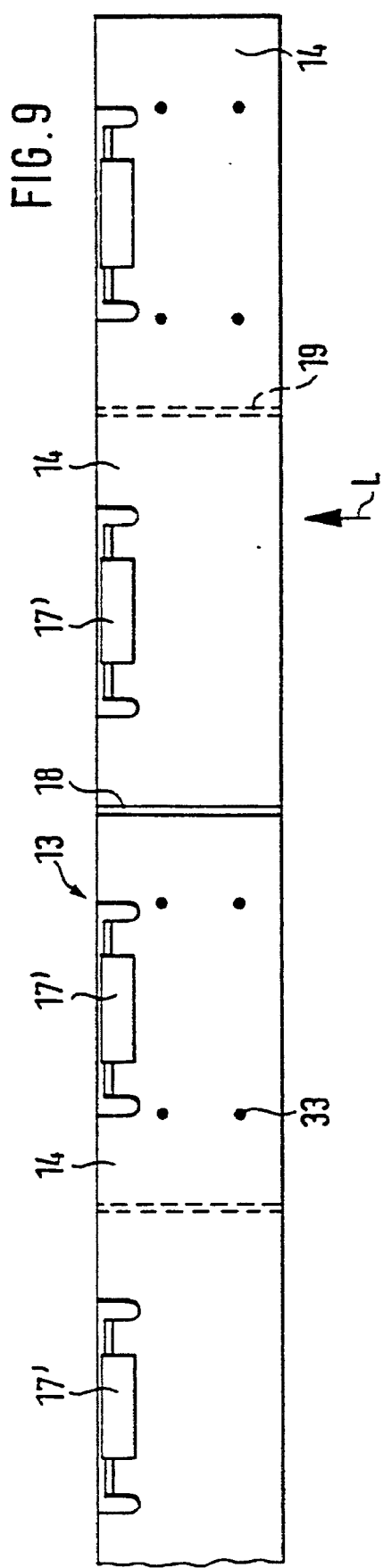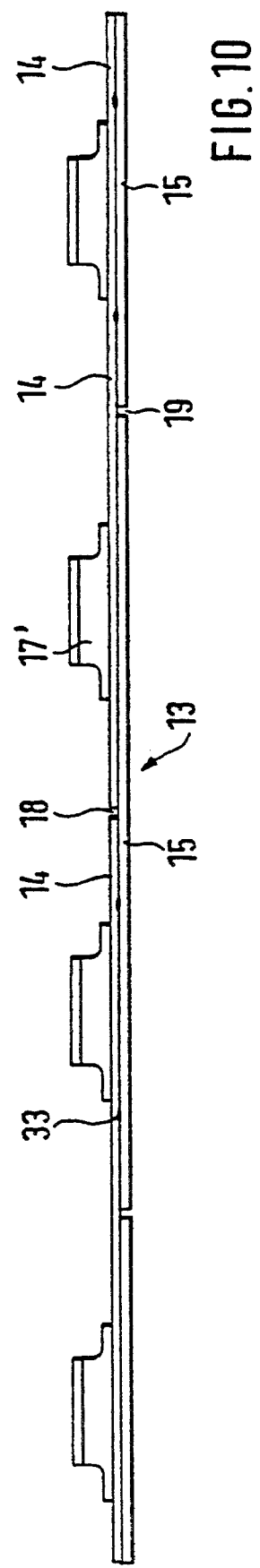

DEVICE FOR SEALING A GAP BETWEEN COMPONENTS OF GROUPS OF COMPONENTS

BACKGROUND AND SUMMARY OF THE INVENTION

The invention relates to a device for sealing a gap between at least two components or groups of components which are arranged to be movable with respect to one another, particularly of a heat exchanger, in which a strip-shaped sealing body which is connected with the one component is sealingly and movably guided in a groove of the other component.

Difficulties arise, for example, in the case of internal-combustion engines, gas turbines, jet engines or heat exchangers, with respect to sealing off, in a comparatively simple and reliable manner, gaps through which a hot liquid, such as gas, flows. In particular, this is so because the mutually adjacent components which form the gap are subjected to different thermally caused expansions as well as spatially different motions which may result from shock loads, among others.

The German Patent Document DE-OS 35 14 377 concerns solutions for the discussed problem in the case of a heat exchanger of a cross-counterflow construction which has essentially parallel collecting pipes for the supply of compressed air into a tube matrix and the removal of compressed air from a tube matrix which consists of U-shaped profile tubes, and also has a casing surrounding the matrix for the purpose of a hot gas flow through the matrix. In a first version of the known case, a gap between mutually adjacent components (guide wall of the tube matrix/casing) is to be bridgeable with respect to supplied hot gas by means of a motion compensating differential pressure seal. In this case, a thin sheet metal strip or a foil is to be provided which is fastened to the casing (first component) and which is to engage with axial and radial play in a groove connected with the guide wall (second component, for example, "shell"), the groove being formed of a fork-shaped support. Exclusively as a function of the existing differential pressure, the thin strip, for example, is to fit snugly in a sealing manner against an inner groove flank. A significant disadvantage of this solution is the fact that the sealing effect will fail in cases in which there are virtually no or comparatively low pressure differences. Another disadvantage of this first sealing version of the known case is the one-sided component-related rigid connection and construction of the strip-shaped sealing element. Thus, the sealing element itself is not constructed to be compatible with respect to heat and motion. The spatial motion-compensating degree of freedom of this sealing concept is therefore comparatively severely limited. In a second sealing version of the known case, instead of the differential pressure seal (strip, foil), a brush seal is to be arranged in the concerned gap, in the case of which one set of free ends of the bristles are to movably engage in the groove while the bristles are locally compressed. This known concept has the significant disadvantage of comparatively high manufacturing expenditures of the brush seal (bristle packing) as well as a wear caused by friction and temperature influences which starts relatively early. By itself, this known concept is also known from the German Patent Document DE-OS 35 14 382.

The invention is based on the object of providing a seal according to the initially mentioned type which has low wear and is reliable irrespective of existing differential pressures, particularly in view of operationally caused comparatively severe mutual spatial component movements and displacements at the gap to be sealed.

The concerned object is achieved according to the invention by a device for sealing a gap between at least two mutually movable components, comprising a seal secured to one of the at least two components and being guided movably and sealingly in a groove in the other component, wherein said seal is formed of plate-like elements, said plate-like elements are arranged movably in a longitudinal direction of said gap and are freely expandable, wherein said plate-like elements are suspended to pivot on said one component, and a clamping device for movably holding said plate-like elements on said other component.

It is therefore achieved that a cost-effective, reliably operating seal is provided, particularly with respect to hot gas, and specifically also in all cases in which relatively high deviations occur from the desired gap geometry. This is achieved even in relation to relatively large mutual component displacements with respect to the normal position which occur in all three directions in space. In this case, the sealing body may be constructed to be movable in the longitudinal direction of the gap, or individually movable in itself and compatible with respect to thermally caused expansions, which, among other facts, is achieved by way of the mutual distance gaps between adjacent borderings of the skinplates. According to the invention, the sealing body may also be interpreted to have the shape of a shingle with two or several layers. At least a double-layering of the elements or metal sheets ensures a mutual and tight bridging of the distance gaps which is offset in the longitudinal direction of the gap.

The spring-type embracing of the end of the sealing body which faces one component side has, among others, the following important advantages: A perfect sealing, specifically, irrespective of the differential pressure, also in the case of a relatively extensive relative component offset, transversely to the dimension of the width of the gap to be sealed. A "spring pliers construction" (wall segment) of the groove on at least one side ensures the sealing absorption of a combined sliding and swivelling motion of the sealing body. In this case, the swivel motion is promoted by the hook suspension which relates to the component on one side and which, in turn, permits the displacement of the elements or of the sealing body in the longitudinal direction of the gap. At the same time, the groove is capable of receiving the "plate structure" composed of individual elements in a motion compensating manner in the longitudinal direction of the gap. The spring-type embracing of the sealing body at the groove results in a mutual holding-together of the individual elements or metal sheets without the requirement of first relying on local mutual fixing points of the metal sheets or plates.

Advantageous developments of the invention are found in claims 2 to 13. The invention will be explained by means of examples illustrated in the drawings.

BRIEF DESCRIPTION OF THE DRAWINGS

FIG. 5 is a view of the sealing body in the viewing direction X of FIG. 4 for illustrating the suspension structure of the elements as sheets or plates which are constructed on the casing in the manner of shackles;

FIG. 6 is a frontal view of the sealing body in the viewing direction Z from FIG. 5;

FIG. 9 is a view of sealing bodies which are part of FIGS. 7 and 8, but in the viewing direction Y from FIG. 7; and FIG. 10 is a view of the sealing body from FIGS. 7 to 9, viewed from the direction L of FIG. 9.

DETAILED DESCRIPTION OF THE DRAWINGS

Figure 1:
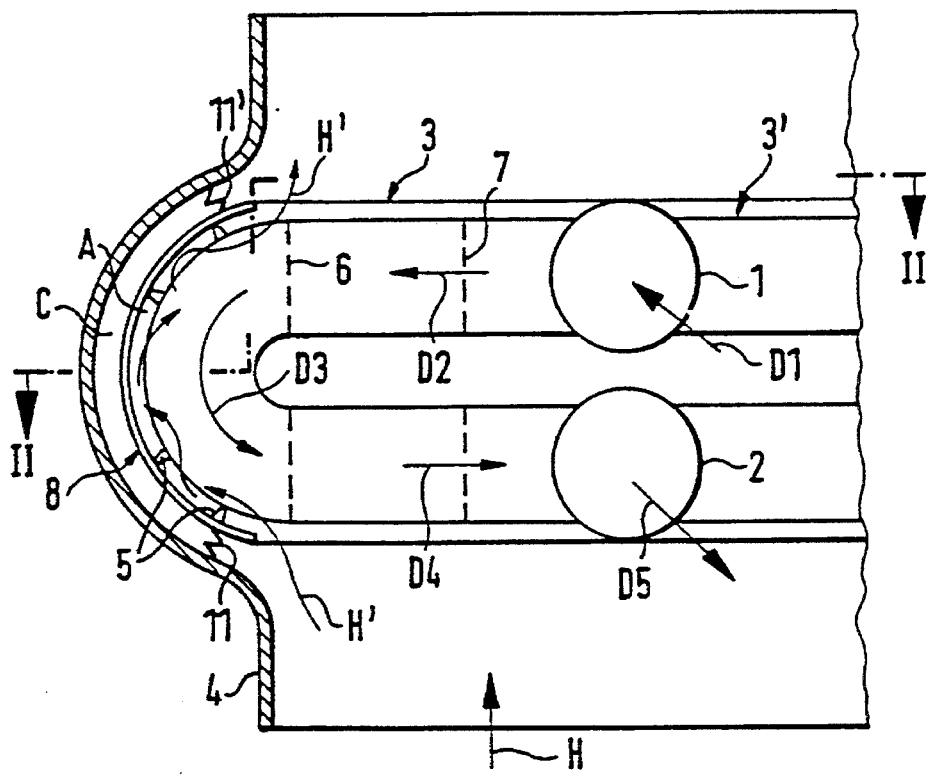
FIG. 1 is a frontal view of a profile tube heat exchanger in a cross-counterflow construction, which is cut open on the casing side and is partially broken away, as a preferred embodiment of the device according to the invention.
Figure 2:
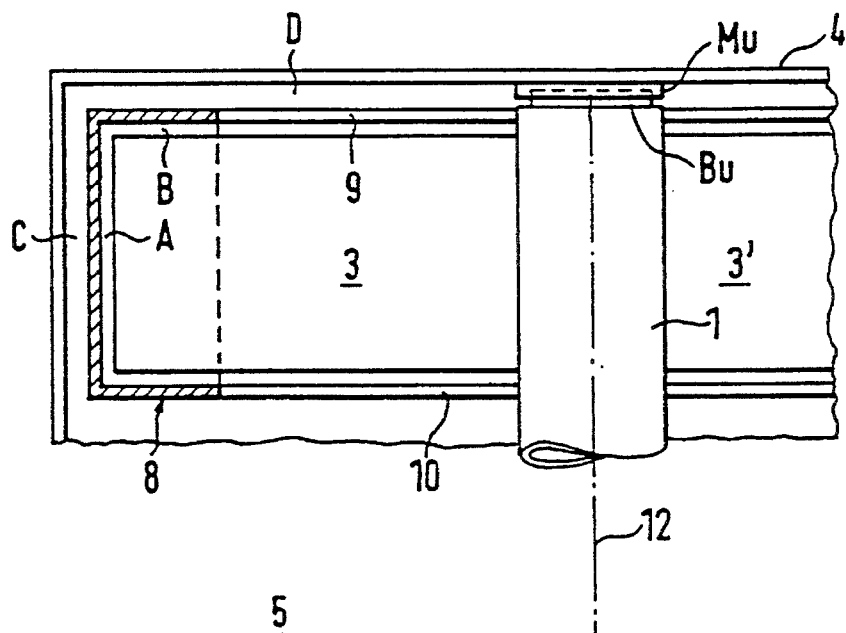
FIG. 2 is a partially broken away sectional view according to the intersection line II—II of FIG. 2.
Figure 3:
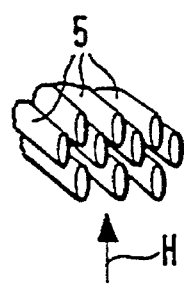
FIG. 3 is a perspective cut-out of elliptic profile tubes of the matrix in an orientation with respect to the hot gas flow direction.

FIGS. 1 to 3 explain, by way of examples, an advantageous possibility of applying the invention to a profile tube heat exchanger in a cross-counterflow construction. The heat exchanger consists essentially of two collecting pipes 1,2 which are arranged in parallel next to one another and to which a U-shaped profile tube matrix 3 or 3' is connected, in this case, on mutually opposite sides respectively. This profile tube matrix 3 or 3' projects transversely into a hot gas flow H which is guided by the casing 4. The respective matrix 3 or 3' consists of U-shaped profile tubes, of which some, according to FIG. 3, have the reference number 5 with respect to a straight-leg section of the U. The profile tubes 5 have, for example, an elliptic cross-section, and, in this case, hot gas H flows around them approximately in the direction of the respective large elliptical axis. Spreaders 6, 7 may be arranged in the regions of the corresponding matrix, such as 3, which are shaded, in order to let the profile tubes (FIG. 3) engage in one another at a uniform mutual distance. In the case of this heat exchanger, during the operation, compressed air to be heated flows according to the arrow D1 into the collecting pipe 1 which is on top in this case and then flows through the profile tubes 5 of the matrix 3 or 3' according to the sequence of arrows D2, D3, D4 while including a reversal of the flow direction (D3). The compressed air, which is heated in such a manner by way of the hot gas H, can then be fed from the collecting pipe 2, which is on the bottom here, according to the arrow D5, to a suitable consuming device, such as the combustion chamber of a gas turbine engine.

As also illustrated in FIGS. 1 and 2, the respective matrix, such as 3, has a shell-shaped cover 8 which shrouds the concerned curved matrix area on the outside as well as laterally at distances A (FIG. 1) and B (FIG. 2). In particular, the distance gap A is bridged by means of motion compensating brush seals S at spaced locations so that the individual U-shaped profile tubes or tube bows can expand individually into the gap A, in which case, at the same time, a course of flow H' of the fed hot gas is forced which is disposed at the curve edge and increases the heat exchange rate in the curved area to the benefit, in turn, of a uniform hot gas mass flow distribution to the overall matrix.

As illustrated particularly in FIG. 2, the respective matrix, such as 3, also has guide walls 9, 10 which extend laterally on the outside in the longitudinal direction of the profile tubes and which may be connected with the collecting pipes 1, 2 and possibly—for example, as illustrated—with the cover 8. According to FIGS. 1 and 2, additional distance gaps C and D must be bridged tightly and spatially in a motion compensating manner. For this purpose, the device according to the invention may advantageously be used for the sealing; specifically according to FIG. 1, at the schematically indicated points 11, 11'—in the gap C—between the curved arching of the casing 4 as one component or component section and the cover 8 as the other component or component section. In addition, for example according to the invention, the distance gap D (FIG. 2) between the casing 4, as the one component or component section, and the adjacent guide wall 9 with the lateral wall portion of the cover 8, as the other component or component section is to be bridged tightly and spatially in a motion compensating manner. The gap C is, among other things, used for the compensation of the relatively high free expandability of the cover 8 which takes place in the longitudinal direction of the profile tubes, in this case, for example, together with the two guide walls 9, 10, whereas the casing 4, in turn, remains freely expandable with respect to the cover 8. The guide walls, such as 9, are connected directly with the collecting tubes 1, 2. Thus, for example, the guide wall 9 is subjected to a position change which follows a thermally caused length change of the collecting pipes 1, 2 in the direction of their respective longitudinal axes, such as (FIG. 2). In view of such pipe length changes, the collecting pipes 1, 2 may be held in the casing 4 in an axially displaceable manner; see for example. The sliding fit bush Bu in sleeve Mu at the casing 4. In addition, the mentioned gaps C and D are required, among other things, for permitting free mutual relative movements between the matrix, such as 3, and the casing 4 resulting, for example, from horizontal and vertical impact or shock loads (driving operation). In order to permit the mentioned criteria, however, the mentioned gaps C and D must at the same time be sealed off as optimally as possible so that, as a result, the fed hot gas can be fully utilized in the heat exchange process and thus does not flow off by way of the mentioned gaps without being utilized.

Figure 4:
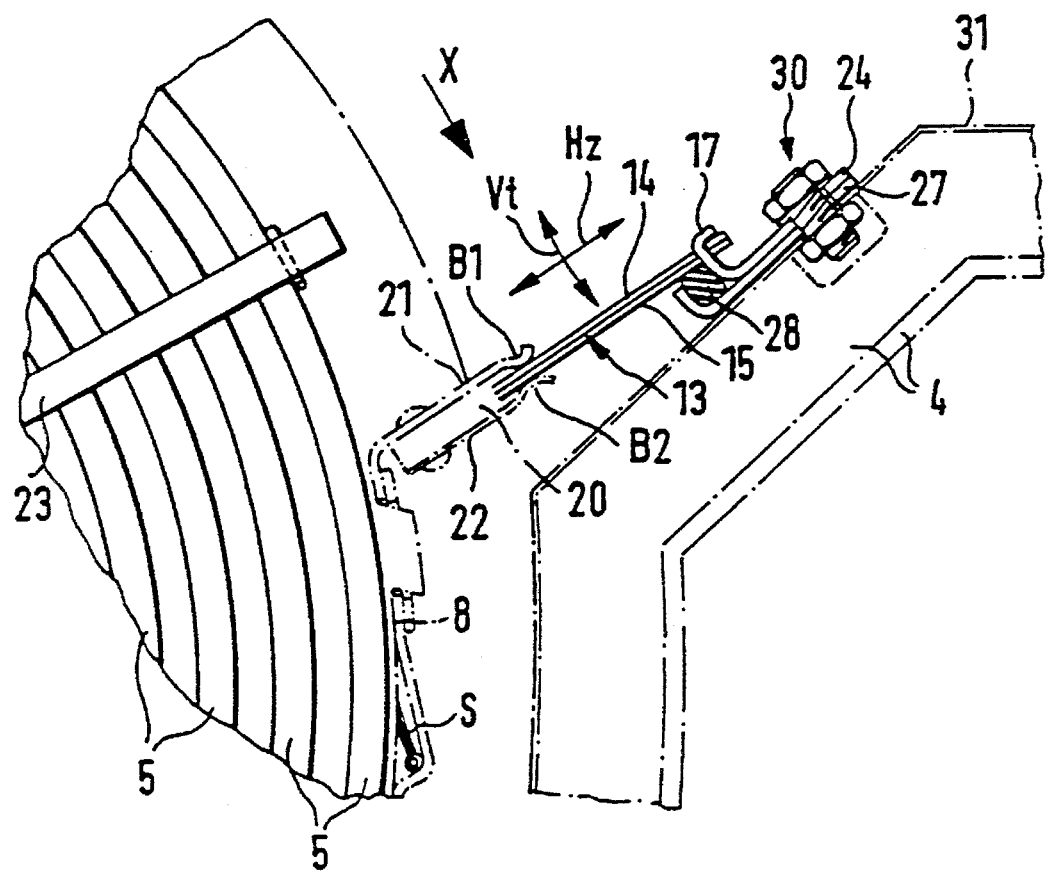
FIG. 4 is a view according to the invention between sections, viewed from the front, of the curved area of the matrix and of the casing, viewed from the front, in this case, in contrast to FIG. 1, arranged on the right-hand side of the heat exchanger.

FIGS. 4, 5 and 6 relate to the device for sealing a distance gap according to the invention within the meaning of C according to FIG. 1. As illustrated particularly in FIGS. 5 and 6, the respective sealing body 12 is composed of elements 14, 15, such as sheet metal plates or the like, in this case, in a double-layered manner. The elements 14, 15 are arranged to be slidable in the longitudinal direction of the gap in a spatially limited manner. They can also be displaced in the sense of a pushing together or an extending relative to one another in the longitudinal direction of the gap. In this case, this takes place, for example, by way of the suspension devices, which relate to the component on one side of the sealing body together with the elements 14, 15. Thus, the elements 14, have longitudinal slots 16 (FIG. 5) in a plane which follow one another in the longitudinal direction of the gap and by means of which the sealing body 13, together with the elements 14, 15, is arranged or suspended to be loosely swivelling on the hook 17 (see also Vt—FIG. 4) as well as axially displaceable in the longitudinal direction of the gap, and slidable relative to one another in elements. In a manner that will be explained in the following, the hooks 17 are fastened to the casing 4.

While predetermined distance gaps 18, 19 are left between (FIG. 5, 6) borderings of the elements 14 and 15 which follow one another in the longitudinal direction of the gap, these are arranged to be freely expandable relative to one another in the longitudinal direction of the gap. In this case, there is always a sealingly overlapping bridging of the distance gaps; that is, element 14 on gap 19 and element 15 on gap 18. According to the invention, the mentioned construction of the sealing body 13 may also be described to be "shingle-shaped". The end of the sealing body 13 which faces away from the suspension side (hook 17) is, together with the respective elements 14, 15, with a clamping effect, spatially movably guided in a groove 20 (FIG. 4) situated on the other component. The groove 20 creates a sliding and sealing fit with respect to jaw ends B1, B2 bent over in the manner of tongs with respect to the corresponding end of the sealing body 13. The groove 20 is formed by wall segments 21,22 which contain the jaw ends B1, B2, and are locally held at a mutual distance from another end of which the lower wall segment 22 is at the same time constructed in this case as a spring body or spring plate. As a modification, the two wall segments 21,22 may also be constructed as spring bodies. As illustrated in FIG. 4, at least one wall segment 21 of the groove 20 is formed by a locally bent portion of the cover 8 as the "other component" in this case. Here, arrow F marks, in FIG. 4, a relative movement of the cover 8 with respect to the casing 4 that is to be compensated. In FIG. 4, the directions of the arrows Hz and Vt mark the relative degrees of freedom of the sealing device in the horizontal and vertical direction.

Of the tube matrix 3' which is schematically outlined in FIG. 1 (drawn to be partially broken off there), in FIG. 4, a corresponding part of the matrix curve area is indicated by a row of profile tubes 5, which is shown in a broken-off manner, together with the spreaders 23. In FIG. 4, S indicates one of several brush seals (also see FIG. 1).

As also illustrated in FIGS. 4 and 5, the hooks 17 are components of a sealing or mounting plate 24 which extends in the longitudinal direction of the gap. This mounting plate 24 may also be constructed as individual plates with mutual distances 25 between adjacent borderings in a thermally compatible manner. At points 26, the mounting plate may, for example, by means of spot welding, be connected with a plate 27 (FIG. 4) which extends in parallel to it. By means of an end part, which is bent in the manner of a shackle or hook with respect to the sealing body 13, the thus constructed "double-shackle body" therefore accommodates an elastically deformable sealing device, constructed in this case, for example, as a sealing cord 28. The cord 28 is therefore fixedly tied in between the respective hook 17 and the inwardly bent portion of the inner plate 27. The sealing device or cord 28, according to the invention, may be manufactured of a ceramic asbestos fabric. The thus constructed "double-shackle body", together with the sealing cord 28, is connected at several points 29 (FIG. 5), which follow one another in the longitudinal direction of the gap, with pertaining screwed-joint nut screwed connections 30 (FIG. 4)—in this case with a thermally insulated inner wall segment 31 of the casing 4. Thus, the suspension-side end of the sealing body 13 (FIG. 4), along a layer of elements 15 that follows one another in the longitudinal direction of the gap, is always sealingly disposed on the sealing cord 28 which is anchored on the casing 4 in the described manner.

While the same reference numbers for identical or essentially identical components are used, FIGS. 7 to 10 represent a modification of the device which, in this case, is constructed between a guide wall 9 (see also FIG. 1) and a casing 4 which is adjacent to it by means of a distance gap D. In this case, the groove 20 is formed between two individual wall segments 21, 22, in which case, in turn, the wall segment 22 which is on the bottom here, as the spring body, forms the initially mentioned tight embrace of one end of the sealing body 13. In this case, according to FIGS. 7 and 8, the groove 20 also extends in the longitudinal direction of the gap and, at points which follow one another at a distance in this direction, is connected, for example, by means of rivets 32, with the respective guide wall 9.

In the case of the embodiment according to FIGS. 7 to 10, the respective elements 14 and 15—or plates—of the sealing body 13 in zones, which are situated outside the mutually overlapping or bridged distance gaps 18, 19, at point 33 are mutually connected locally, for example, by means of point welding. In this case, therefore, for example, two elements 14, 15 respectively, which are connected with one another in a punctiform manner, separately and relative to adjacent additional two elements 14, 15 which are connected with one another in this manner, form plate units which are displaceable relative to one another or jointly in the longitudinal direction of the gap.

In the example according to FIGS. 7 to 10, it is also provided that the hooks 17' are formed of one-sided bended end portions of, in this case, the upper layer of elements 14 or plates which follow one another in the longitudinal direction of the gap, for the one-sided component-related suspension on the casing 4. In this case, the hooks 17' are suspended in slots 16' of shackles 34 which are laterally bent components of a mounting plate 35. The mounting plate 35 also extends in the longitudinal direction of the gap and is connected with the casing 4. In this case, the mounting plate 35 is disposed in a fixedly anchored manner in a recess 36 which is formed between correspondingly shaped-out inner and exterior wall structures of the casing 4. The latter applies analogously to the arrangement of the sealing device extending in the longitudinal direction of the gap which, in this case, is again constructed as a cord 28. This cord 28 is disposed in a groove which is open toward the top and which is tightly fitted on the casing side between locally bent inner structure components of the casing 4 and the mounting plate 35.

Figure 7:
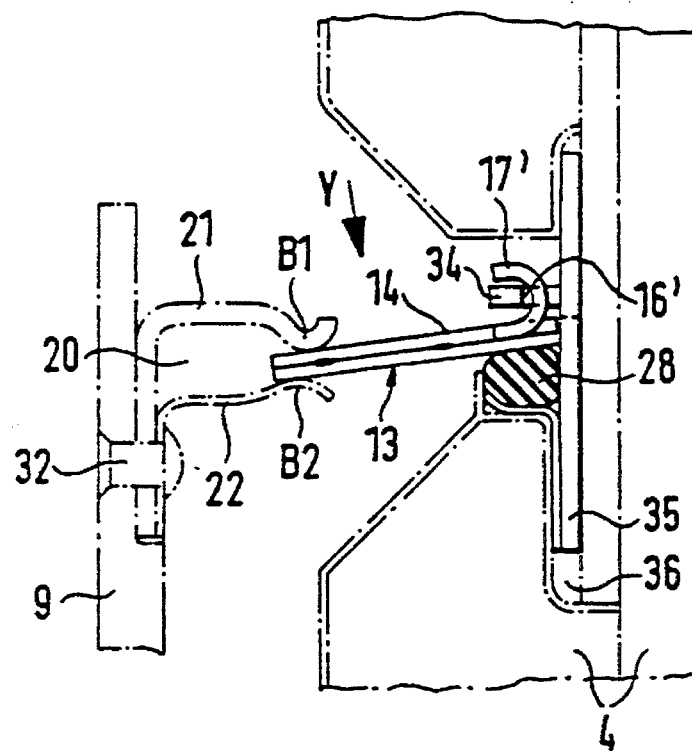
FIG. 7 is a view of an embodiment of the device according to the invention that was modified with respect to FIGS. 4 and 5, in this case, in an arrangement between a guide wall segment of the matrix and a casing section, while, for example, bridging a gap according to D of FIG. 2, as well as in the cold or inoperative state.
Figure 8:
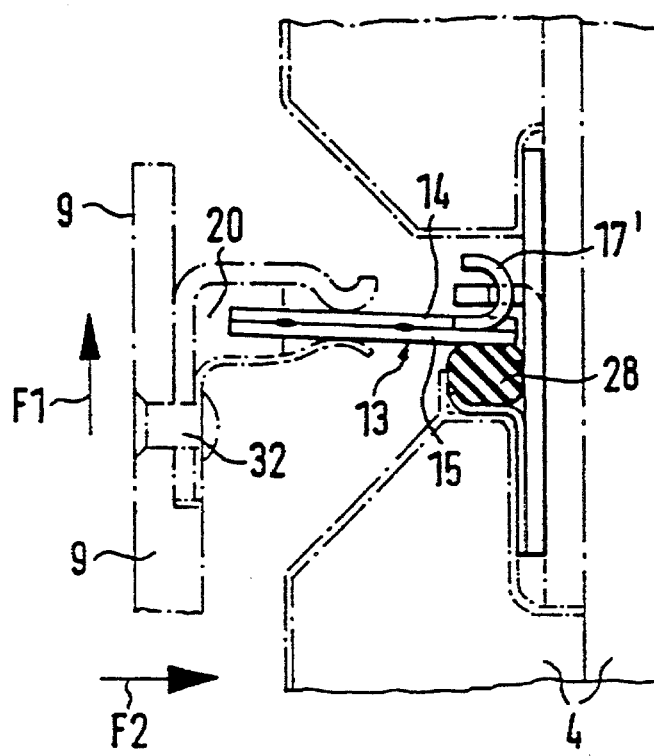
FIG. 8 is a view of the device according to FIG. 7, but in the hot state (thermally caused offset of the component position)

FIG. 7 illustrates the device in the cold or inoperative state. On the other hand, FIG. 7 represents the device together with the component positions in the hot state; that is, the position change of the guide wall 9 in the direction of the arrow F2 upwards as well as horizontal movement in the direction of the arrow F2 onto the casing 4. The mentioned position changes are spatially compensated according to FIG. 8 in the combination of the swivel feature and a simultaneous horizontally deeper slide-in movement of the sealing body 13 into the groove 20.

To the extent that they have not been explicitly claimed, the characteristics and functions which were described and illustrated as examples are also objects of the present invention.

What is claimed is:

1. A device for sealing a gap between at least two components being subjected to mutual spatial movements, comprising:

a lamellar sealing member pivotally joined in a longitudinal direction of said gap to one of the at least two components, said lamellar sealing member being guided movably and sealingly in a groove of a clamping device extending in the longitudinal direction of said gap on the other component;

wherein said lamellar sealing member is formed of plate-like elements, said plate-like elements are arranged movably and fluid-tight in the longitudinal direction of said gap and are freely expandable;

wherein said sealing member is urged against an elastically deformable seal being fixedly connected to the one component in the longitudinal direction of said gap;

wherein the groove of said clamping device includes opposingly facing curved jaws for movably and sealingly holding said sealing member with the plate-like elements therebetween on the other component; and wherein at least a part of said clamping device with one of said curved jaws at the groove forms a spring-like wall member acting resiliently on said sealing member and allowing the sealing member to pivot.

2. A device according to claim 1, wherein the elements of the seal are arranged in several layers, each of said layers having a number of distance gaps allowing movement in the longitudinal direction of the gap, each of said layers mutually and tightly overlapping the distance gaps successively in the other of said layers in the longitudinal direction of the gap.

3. A device according to claim 2, wherein a number of said plate-like elements displaced in the longitudinal direction of the gap and secured locally to each other form a seal unit, said seal unit being movably arranged to at least one further seal unit.

4. A device according to claim 1, further comprising hooks arranged at several locations along the gap in a longitudinal plane to suspend said seal, said hooks allowing said seal to pivot transverse to said plane and move in the longitudinal direction of the gap.

5. A Device according to claim 4, wherein said hooks are connected to the one component and wherein the seal is loosely suspended to said hooks through one of eyelets, break-throughs and longitudinal slots in said elements.

6. A device according to claim 4, wherein said hooks are formed at one end of one of said layers of elements, and further comprising a mounting plate, having one of eyelets, breakthroughs and longitudinal slots, connected to the one component, said hooks being suspended from said mounting plate.

7. A device according to claim 1, wherein the elastically deformable seal is firmly connected by a support structure to the one component.

8. A device according to claim 1, wherein said clamping device has two jaws allowing a tight, sliding fix of said seal, wherein said clamping device consists of two spring-like wall members forming said groove with said two jaws and acting with said jaws resiliently on said sealing member and allowing the sealing member to pivot.

9. A device according to claim 8, wherein one of said spring-like wall members is formed by a locally angled part of the other component.

10. A device according to claim 8, wherein said both spring-like wall members with said jaws are tightly and firmly connected to the other component at various points along the longitudinal direction of the gap.

11. A device according to claim 1, wherein a number of said plate-like elements displaced in the longitudinal direction of the gap and secured locally to each other form a seal unit, said seal unit being movably arranged to at least one further seal unit.

12. A device according to claim 1, wherein said device seals a gap in a heat exchanger, said heat exchanger comprising a profile tube matrix separated into sections, each section including U-shaped tubes and distributing pipes for feeding and discharging of pressurized air, said U-shaped tubes being coupled at an entry and exit side to said distributing pipes; each section further including guide walls arranged at a distance from a casing carrying hot gas, wherein said device is arranged between various sections of the casing and bordering corresponding sections of the guide walls to form a hot gas seal.

13. A device according to claim 12, wherein the one component is the casing and the other component is at least one guide wall connected to the distributing pipes.

14. A device according to claim 1, wherein the plate-like elements are metal sheets.

* * * * *